Sept. 26, 1933.  J. H. KINDELBERGER  1,928,336
FOLDING WING PLANE
Filed Oct. 23, 1931  9 Sheets-Sheet 1

INVENTOR:
James H. Kindelberger,
BY
ATTORNEY.

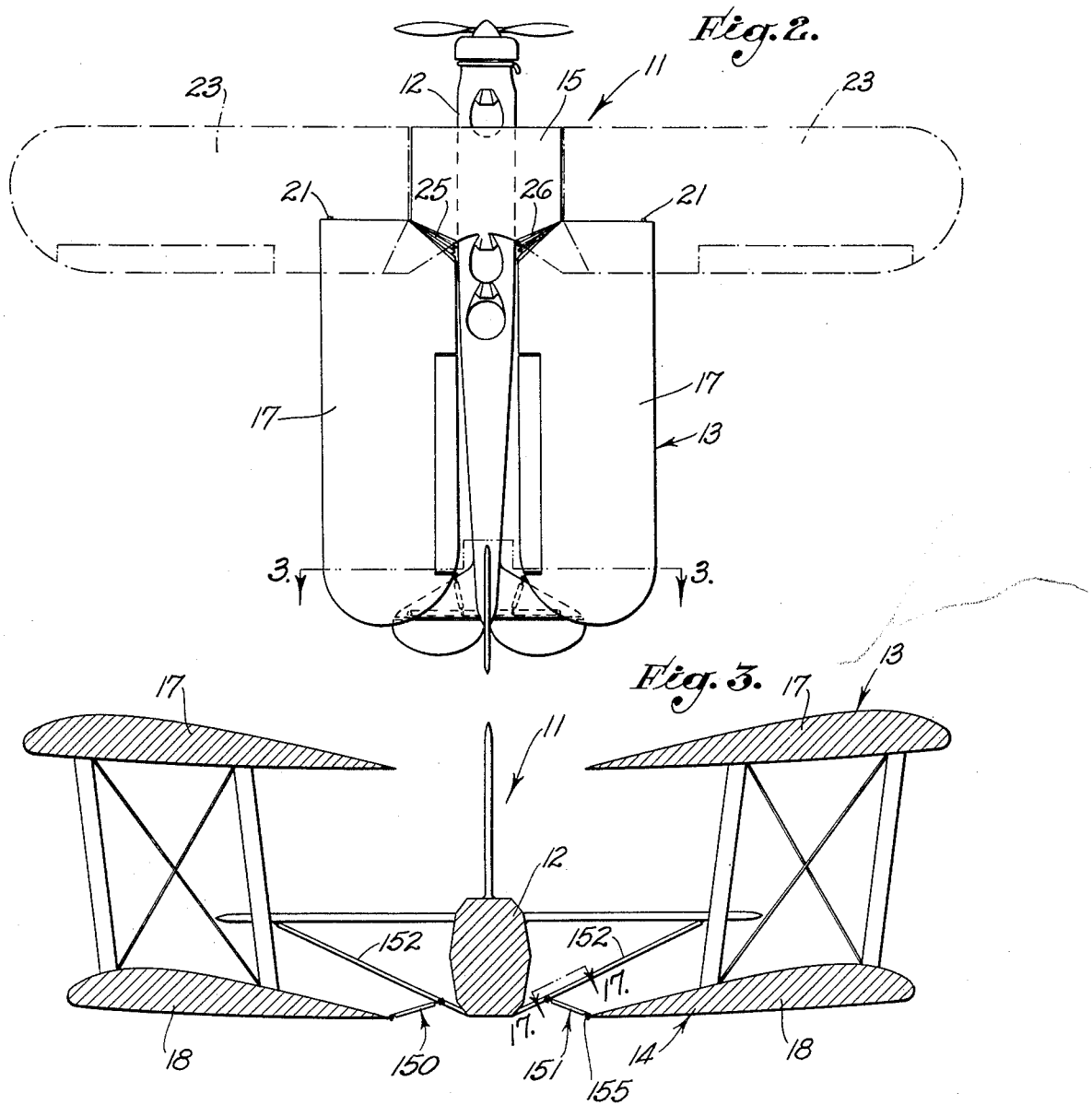

Sept. 26, 1933.  J. H. KINDELBERGER  1,928,336
FOLDING WING PLANE
Filed Oct. 23, 1931  9 Sheets-Sheet 3
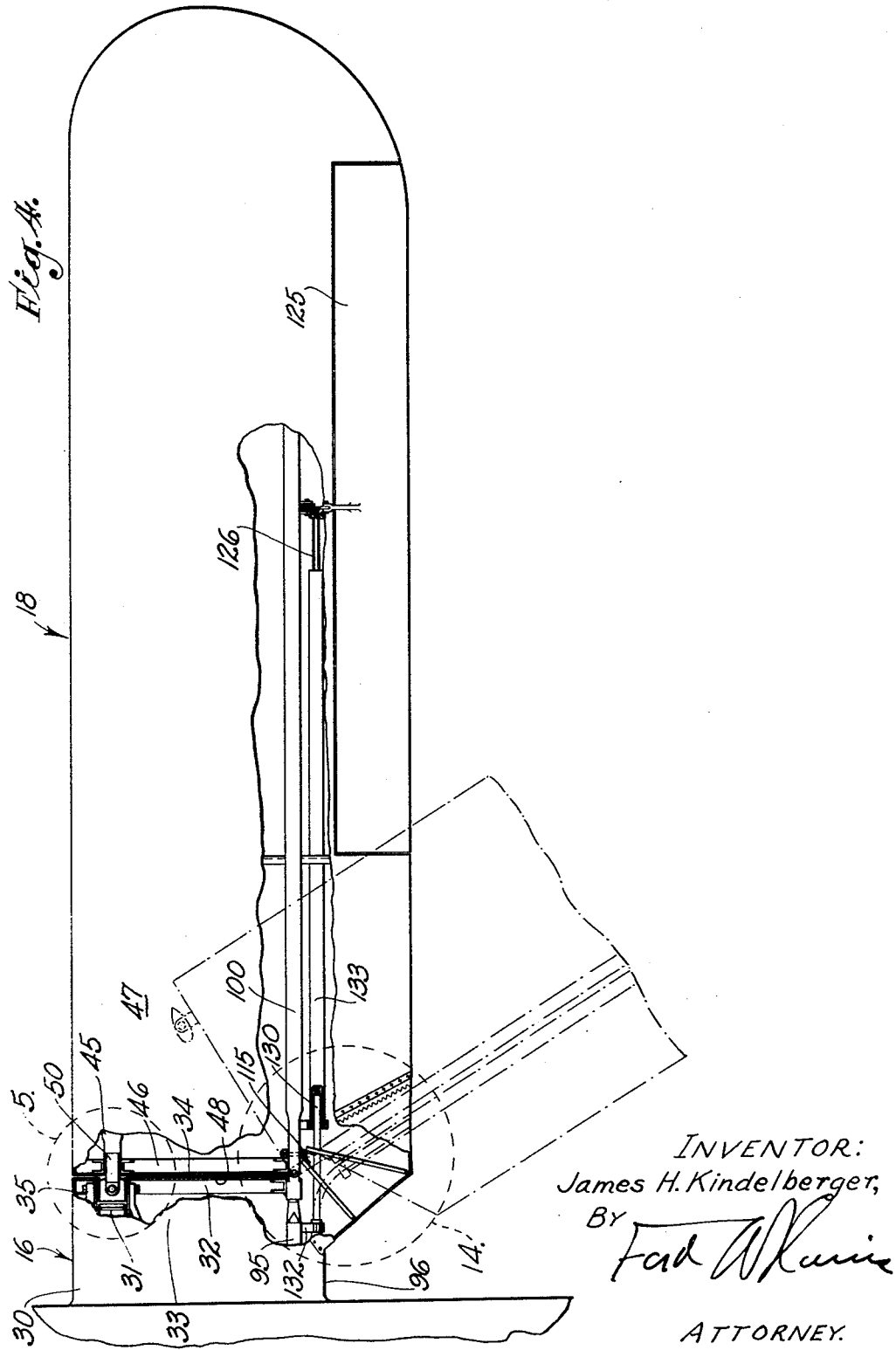

Sept. 26, 1933.  J. H. KINDELBERGER  1,928,336
FOLDING WING PLANE
Filed Oct. 23, 1931  9 Sheets-Sheet 4

INVENTOR:
James H. Kindelberger,
BY
ATTORNEY.

INVENTOR:
James H. Kindelberger,
BY
Fred Adam
ATTORNEY.

Sept. 26, 1933.    J. H. KINDELBERGER    1,928,336
FOLDING WING PLANE
Filed Oct. 23, 1931    9 Sheets-Sheet 6
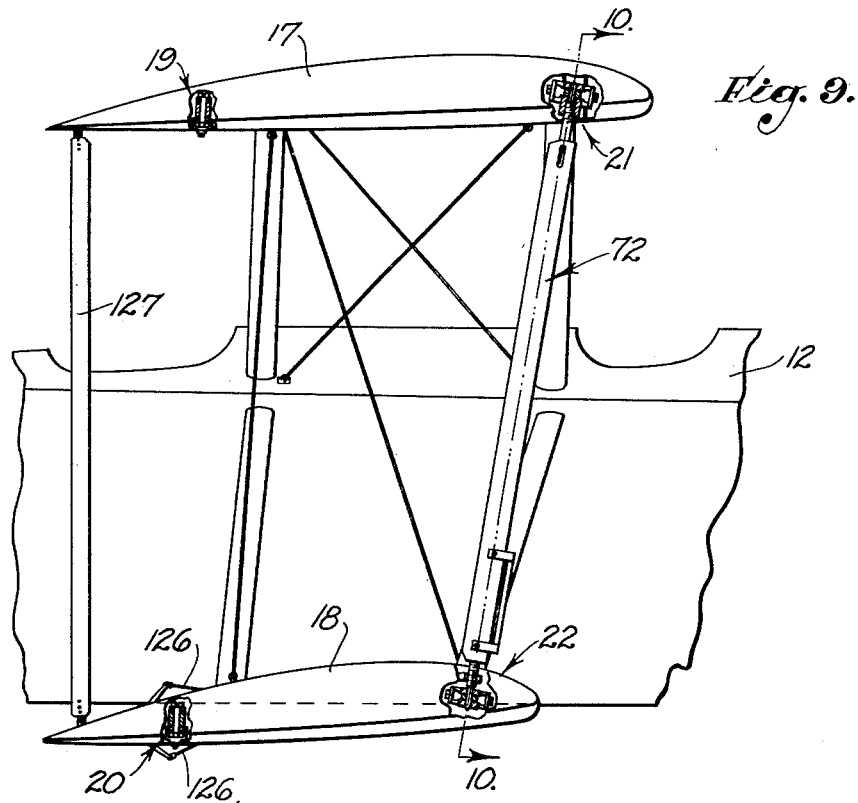
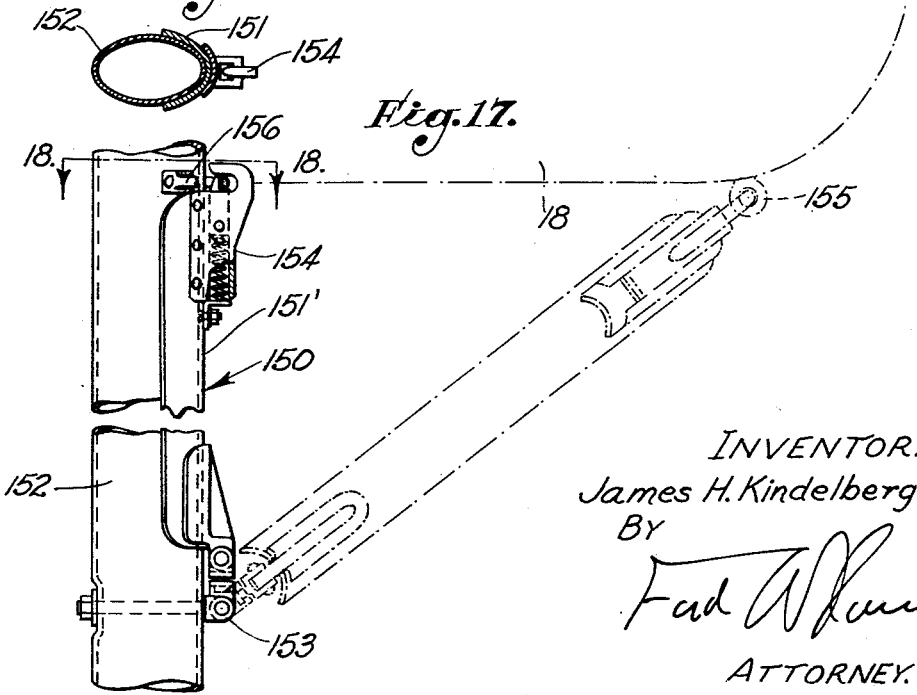
INVENTOR:
James H. Kindelberger,
BY
ATTORNEY.

Sept. 26, 1933.  J. H. KINDELBERGER  1,928,336
FOLDING WING PLANE
Filed Oct. 23, 1931   9 Sheets-Sheet 7
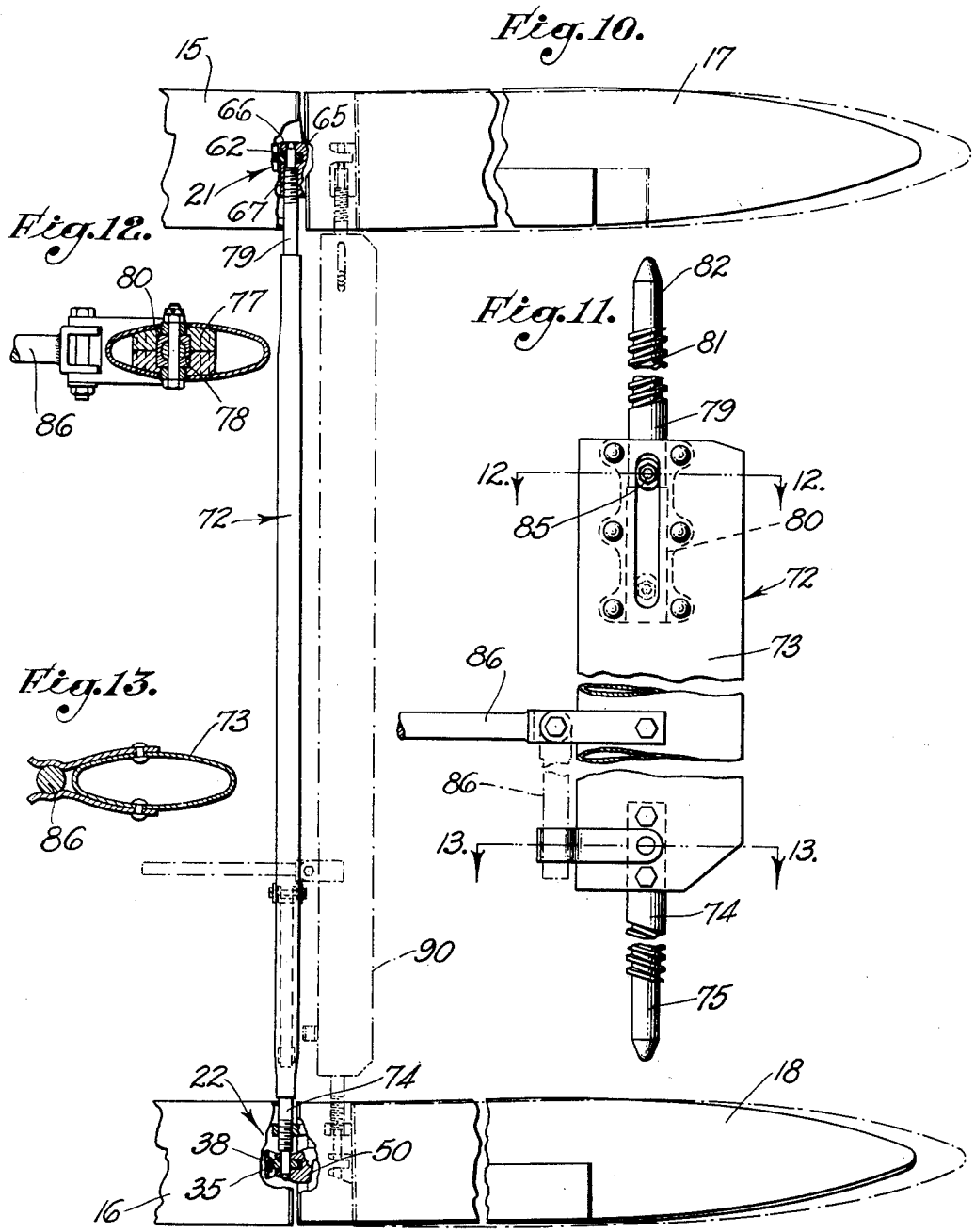
INVENTOR:
James H. Kindelberger,
BY
ATTORNEY.

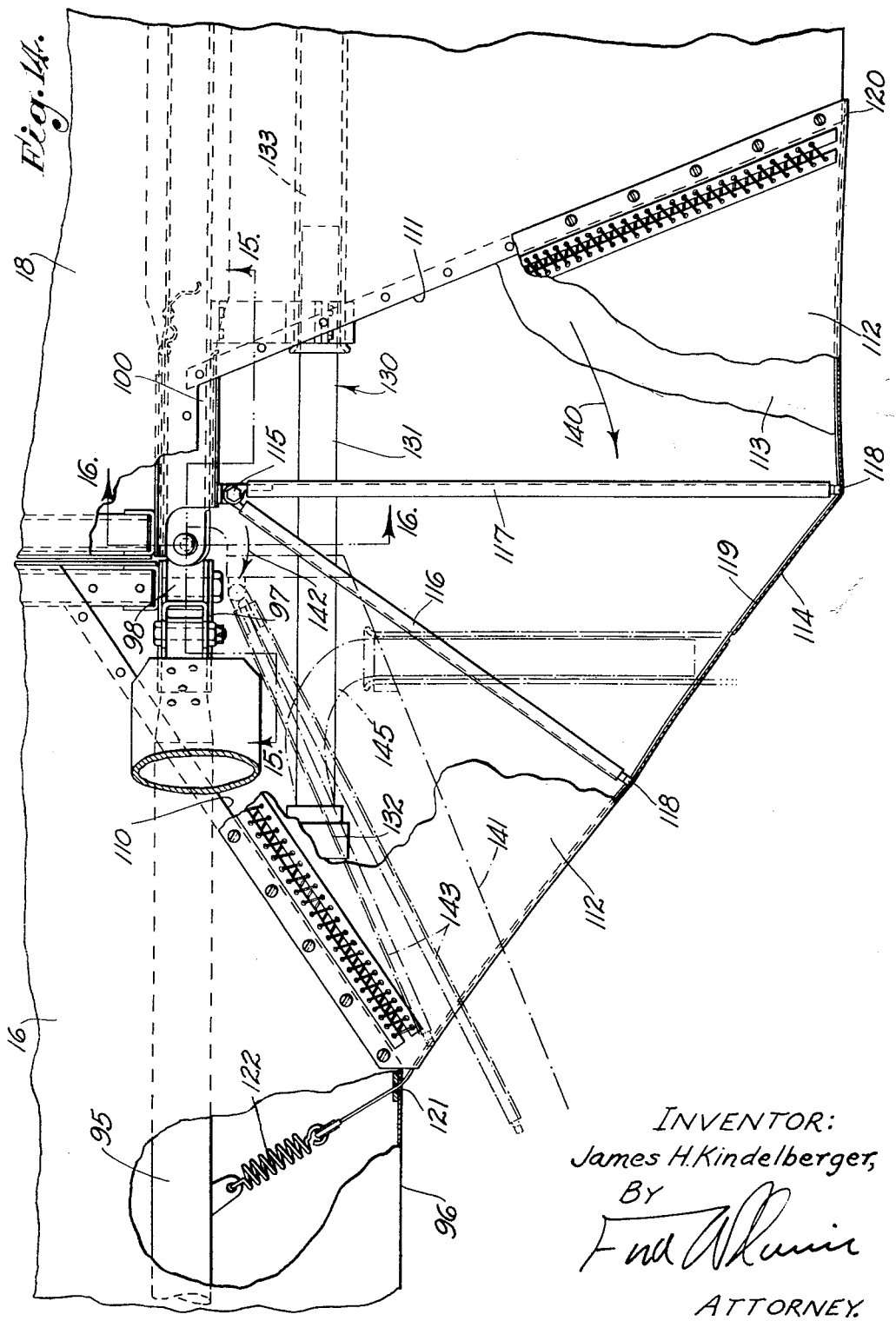

Sept. 26, 1933.  J. H. KINDELBERGER  1,928,336
FOLDING WING PLANE
Filed Oct. 23, 1931    9 Sheets-Sheet 9

INVENTOR:
James H. Kindelberger,
BY
Fad W Davis
ATTORNEY.

Patented Sept. 26, 1933

1,928,336

UNITED STATES PATENT OFFICE 1,928,336

FOLDING WING PLANE

James H. Kindelberger, Los Angeles, Calif., assignor to Douglas Aircraft Company, Inc., Santa Monica, Calif., a corporation of Delaware Application October 23, 1931. Serial No. 570,566

31 Claims. (Cl. 244—12)

My invention relates to aeroplanes and particularly to an aeroplane having wings which are foldable from an extended flying position into a position substantially parallel to the longitudinal axis of the fuselage of the aeroplane.

Considerable difficulty has been experienced in the past in packing aeroplanes for transportation in ships, freight cars, and the like. Due to the area of the wing structure of the ordinary type of aeroplane and the laterally extending relationship thereof with the fuselage of the plane, it has always been difficult to provide suitable storage places that were large enough to accommodate large numbers of aeroplanes without dismantling the planes to conserve space.

It has been proposed in the past to provide aeroplanes with detachable wings so that when large numbers of planes were to be stored together the wing structures of the various planes could be removed and placed on the ground under the fuselage or placed longitudinally along the side of the fuselage.

An aeroplane of this character and the manner of storing the same would serve very well where the planes were to be stored for long periods of disuse, and it would also serve satisfactorily where circumstances permitted a leisurely assembly of the wing structure to fuselage, but a plane with detachable wings of this type would be entirely inadequate for use at an army flying field or in a naval aeroplane carrier where the army and navy regulations require that the planes be at all times ready for immediate service.

With the above mentioned requirements in view, I have designed the aeroplane embodying my invention with the object of providing an aeroplane having a wing structure including an inner stationary wing, outer foldable wings pivoted to each end of the inner wing, and collapsible sections between the outer wings and the inner stationary wing, which collapsible sections are adapted to form parts of the air foil contour of the wing structure when the outer wings are in an extended flying position and are operable to collapse to allow the outer wings to fold into a position substantially parallel to the longitudinal axis of the fuselage of the plane, so that the plane may be placed in a storage space, the area of which is materially smaller than would be required for a plane of equal size having a rigid wing structure.

In an aeroplane having foldable wings of the type described in the above paragraph it is preferable for structural reasons to pivot the outer wings to the ends of the inner wing at points somewhat forward of the trailing edges of the wing structure. This necessitates cutting away adjacent portions of the trailing edges of the inner and outer wings to allow the outer wings to pivot in a rearward direction. The provision of collapsible wing sections between these cutaway portions in combination with the stationary inner wing and the pivoted outer wings is one of the important features of my invention. These collapsible wing sections, by filling the space between the cutaway portions of the inner wing and the outer wings and forming parts of the air foil contour of the wing structure, materially reduce "contour drag" on the wing structure.

In the preferred form of my invention, which, however, is not the only form in which my invention may be embodied, I provide an upper and a lower wing structure, each structure including an inner wing secured to the fuselage, a pair of outer wings pivotally connected to the outer ends of the inner wings, and collapsible wing sections between the adjacent portions of the trailing edges of the inner wing and the outer wings.

My invention is applicable to the monoplane or triplane type of aeroplane as well as to the biplane type, and therefore my invention has, in addition to the above, for its object to provide an aeroplane having a wing construction pivoted to a fuselage construction at a point forward of the trailing edge of the wing construction and in which there is a collapsible section provided between the pivot point and the trailing edge of the wing construction to permit the wing construction to be moved between folded and extended positions.

It is another object of my invention to provide, in an aeroplane embodying the features described in the above paragraph, a locking member associated with each of the upper outer wings and each of the lower outer wings, the locking members of the two adjacent upper and lower wings being associated with a single lock operating strut which is quickly and easily manipulable at will to simultaneously operate these locking members to rigidly lock the outer wings in an extended flying position and to operate the locking members to release the outer wings so that they may be pivoted to a folded position. The simultaneous operation of the locking members of the adjacent upper and lower wings by the single lock strut greatly facilitates the speed with which the aeroplane may be brought into service.

It is another object of my invention to provide locking means for locking the outer wings in their folded position to facilitate the handling of the aeroplane while the wings are folded, for instance, while lowering the plane through the hatchway of the hold of a naval aeroplane carrier.

In order that an aeroplane of this character may be speedily prepared for service, the control cables, connecting the operating mechanism in the cockpit of the fuselage with the ailerons or to other devices to be operated in the wings, must of necessity be attached at all times so that no adjustment, manipulation, or attaching of the various parts is necessary when the wings are moved from the folded position into their normal flying position.

It is another object of my invention to provide in combination with an aeroplane embodying the above described features flexible telescoping control cable guides adapted to support the control cables in their extended operating positions while the outer wings are in their flying position. These telescoping guides are operable to collapse in a telescoping action while at the same time bending to compensate for the change in angle between the longitudinal axes of the inner wing and the outer wings when the outer wings are pivoted to a folded position in such a manner that the slack of the various control cables is effectively prevented from drooping downwardly and becoming tangled or kinked, so that when the outer wings are again moved to their extended position the various control cables assume their relative proper operating positions without adjustment or manipulation.

This portion of my invention is not, however, limited to the provision of the above mentioned conduit means only for cables used for controlling the ailerons. My invention is useful in connection with any steel cables or electrical cables which may extend from the fuselage outward through the wing construction. In various types of planes there are other mechanisms in the wings, in addition to the ailerons, which must be controlled by cables, either steel cables or electrical cables, which extend from these devices in the wings to the control or operating means in the fuselage. My invention therefore comprehends a combination which includes an operated device in the wing, an operating means in the fuselage, control means connecting the operated device and the operating means together, and a conduit having a flexible section at the plane where the wing construction pivots to the fuselage construction.

Another object of my invention resides in the provision of a unique locking construction whereby the wing construction is locked in extended position. This locking construction has many features embodied in the details of construction which will be pointed out when the details of construction of my invention are described.

A still further object of my invention is in the unique arm or attaching construction provided by my invention. This feature of my invention is included in a combination which includes a support member or other member of the aeroplane having a rounded external surface, an arm in the form of a thin wall curved to fit snugly to the member in combination with means for pivotally connecting one end of the arm to the member and other means for detachably connecting the other end of the arm to the member.

The important features of my invention are adapted to separate or conjoint use, and although these features when embodied in a single structure all cooperate to provide an aeroplane superior to an aeroplane including less than the whole of my invention, I do not wish to be limited to an aeroplane including each and every feature of my invention, but wish the scope of my invention to be construed in accordance with the appended claims.

I will now describe the preferred form of my invention with reference to the accompanying drawings.

In the drawings,

Fig. 2 is a somewhat diagrammatic plan view of the aeroplane of my invention showing the wings thereof in folded position.

Fig. 3 is a sectional view through the fuselage and folded wings of the aeroplane, this view being taken as indicated by the line 3—3 of Fig. 2.

Fig. 4 is a plan view of the lower right-hand wing, this view having parts broken away to show the wing pivot, the locking member, and the aileron control cables associated therewith.

Fig. 9 is an end elevation of the upper and lower wing structures looking toward the fuselage of the plane, this view having parts broken away to show the pivots of the wings and the locking members of the upper and lower wings in sections.

Fig. 10 is a sectional view taken as indicated by the line 10—10 of Fig. 9, this view showing the relation of the lock operating strut with the lock members on the adjacent upper and lower wings.

Fig. 11 is an enlarged elevational detail view of the lock operating strut of the invention.

Fig. 12 is a horizontal sectional view taken as indicated by the line 12—12 of Fig. 11.

Fig. 13 is a horizontal sectional view taken as indicated by the line 13—13 of Fig. 11.

Fig. 14 is an enlarged fragmentary plan view comparable to that portion of Fig. 4 within the dotted circle 14 of that figure.

Fig. 17 is an enlarged elevational view of the lock means adapted to lock the wings in folded position, this view being taken as indicated by the line 17—17 of Fig. 3.

Fig. 18 is a sectional view taken as indicated by the line 18—18 of Fig. 17.

Figure 1:
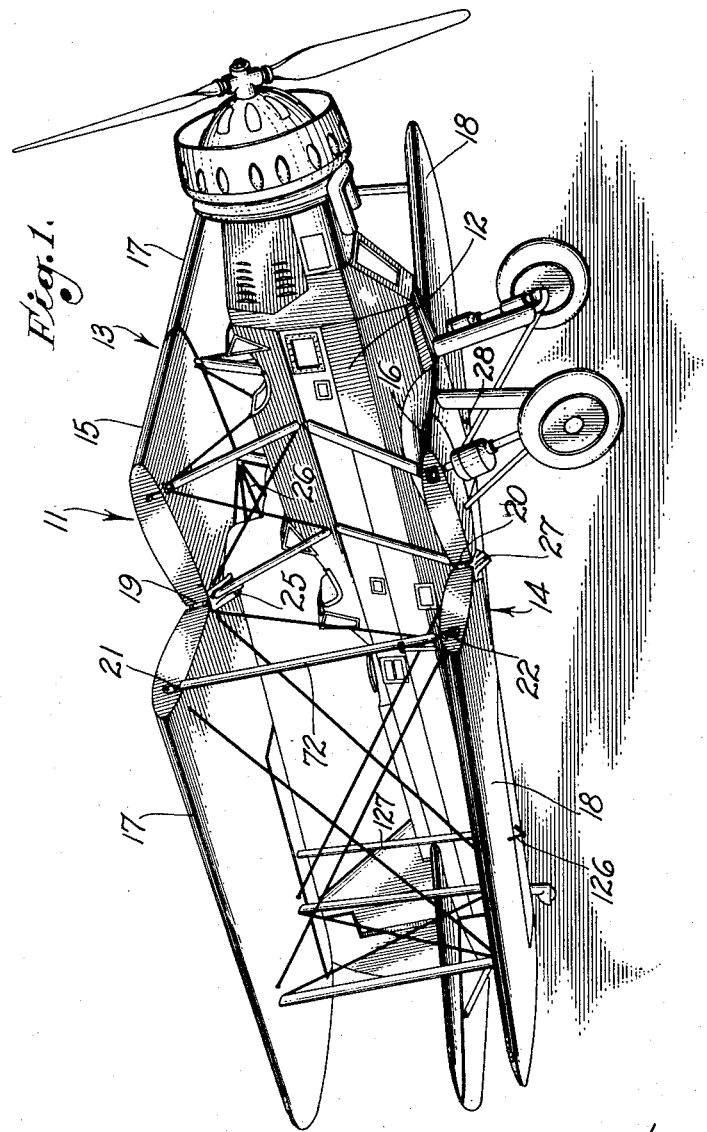
Fig. 1 is a perspective view of the aeroplane of my invention showing the wing structure on one side of the fuselage in folded position.
Figure 5:
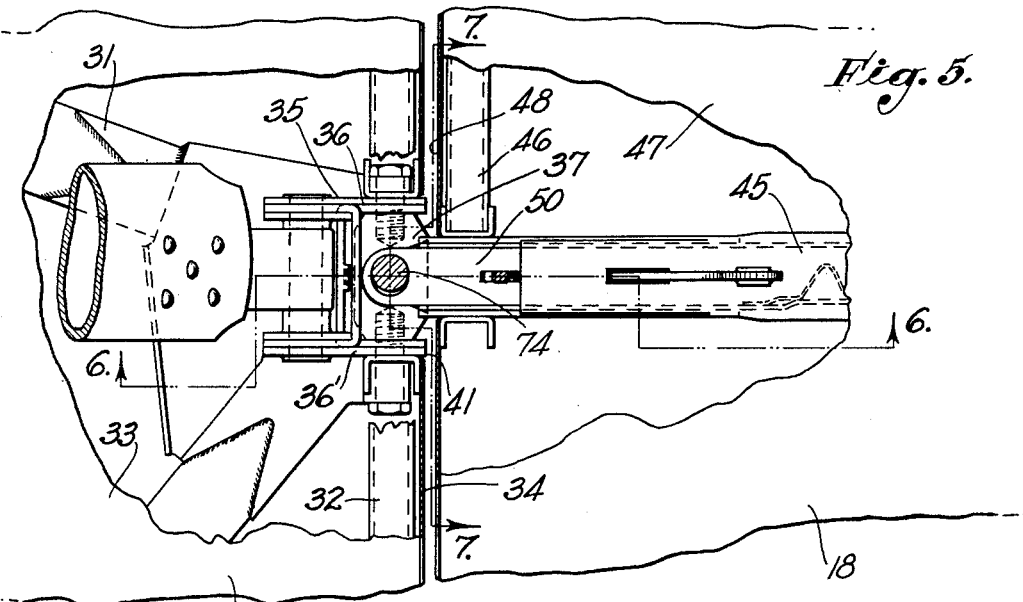
Fig. 5 is an enlarged fragmentary view comparable to that portion of Fig. 4 within the dotted circle 5 of that figure.
Figure 6:
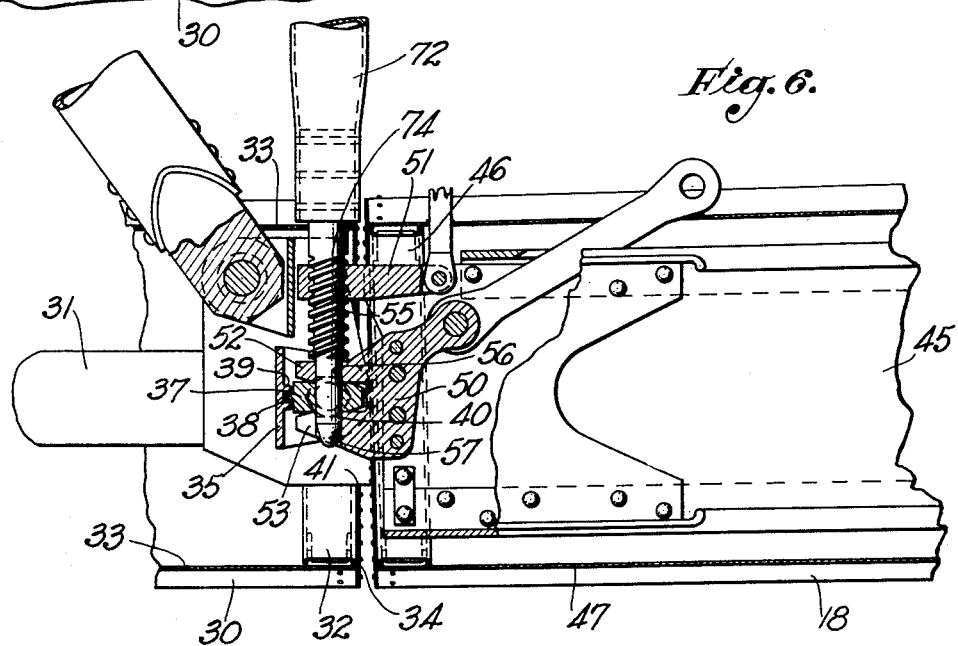
Fig. 6 is a vertical sectional view taken as indicated by the line 6—6 of Fig. 5 and showing the locking member adapted for use on the lower wings of the aeroplane of my invention.

Referring to the drawings, and particularly Figs. 1 to 3 inclusive, I show an aeroplane generally designated by the numeral 11 which comprises a fuselage 12 and upper and lower wing structures 13 and 14.

The upper and lower wing structures 13 and 14 respectively comprise inner wings 15 and 16 which are rigidly secured to the fuselage 12 and to each other by suitable struts substantially as shown in Fig. 1, and outer wings 17 and 18 which are respectively pivoted as indicated at 19 and 20 to the opposite outer ends of the inner wings 15 and 16, the adjacent outer wings 17 and 18 being rigidly secured together by suitable struts and being operable to swing on the pivots 19 and 20 into a folded position substantially as indicated in Fig. 1. In order that the different elements of the aeroplane may be referred to broadly and in order to enable claims to be written which will cover the invention as applied to a monoplane, biplane, or triplane, I will refer to the fuselage 12 and the inner wings 15 and 16 as the fuselage construction. This term, when used, will mean a fuselage 12 plus the inner wings 15 and 16 or any other parts which are equivalent thereto. If, for example, the inner wings are not provided and the outer wings 17 and 18 are pivoted directly to the fuselage, the term "fuselage construction" will then refer to the fuselage 12. However, should a construction be used in which the fuselage and inner wings are provided, then the term "fuselage construction" would refer to the fuselage and the inner wings. The outer wings 17 and 18 will be broadly referred to as a wing construction. This term will be broad enough to cover either a single wing or a plurality of wings.

Locking members generally designated by the numeral 21 in Figs. 1 and 2 are provided on the upper wing structure 13. Locking members generally designated by the numeral 22 are provided on the lower wing structure 14, these locking members 21 and 22 cooperating in a manner to be hereinafter described to lock the outer wings 17 and 18 in their extended flying position shown in dotted lines 23 of Fig. 2.

Collapsible wing sections generally designated by the numerals 25 and 26 are provided between adjacent portions of the trailing edges of the upper inner and outer wings 15 and 17. Collapsible wing sections designated by the numerals 27 and 28 are provided between adjacent portions of the trailing edges of the lower inner and outer wings 16 and 18. All of these collapsible wing sections are adapted to form parts of the air foil contour of the wing structures when the outer wings are in their flying position, and are adapted to collapse in a manner to be described later when the outer wings are moved into their respective folded positions.

Coming now to the details of construction of the various parts of my invention, with reference to the lock members 21 and 22, and with particular reference at first to the member 22 as shown in Figs. 4 to 7 inclusive, I show one of the lower inner wings 16, such as the right-hand wing 30, as including a forward spar 31 extending longitudinally throughout the wing 30, and to the outer end of which is secured in any suitable manner a cross rib 32 having a configuration suitable to form a wing covering 33 which is stretched thereover into an air foil contour. Secured to the outer side of the cross rib 32 is a cover plate 34 adapted to close the outer end of the wing 30. Rigidly secured to the outer end of the spar 31 is a bracket member 35. The bracket 35 is provided with a pair of outwardly extending parallel legs 36 and 36', these legs lying in planes substantially at right angles to the spar 31. Pivotally supported between the legs 36 and 36' in the manner shown in a plane perpendicular thereto is a locking lug 37 which I will hereinafter call a secondary lock member. The secondary lock member 37 is provided with a rearwardly extending boss 38 loosely confined between a pair of superimposed bosses 39 included in the bracket 35, the bosses 39 serving to limit the pivotal movement of the lock member 37. Extending through the lock member 37 is a central cylindrical opening 40. Provided in the cover plate 34 is an opening 41 affording access to the lock member 37.

Figure 7:
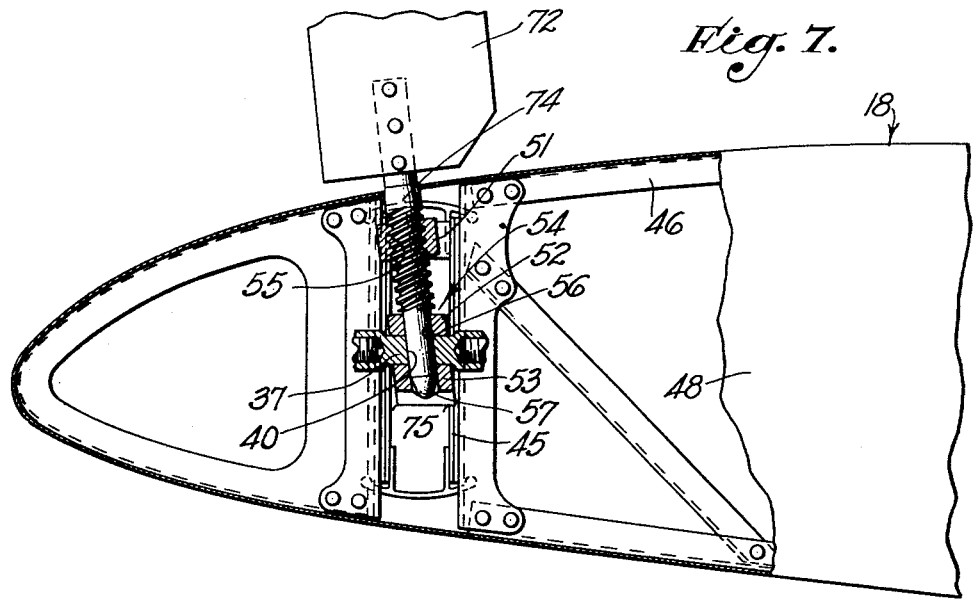
Fig. 7 is a vertical sectional view taken as indicated by the line 7—7 of Fig. 5.

The outer wing 18 associated with the wing 30 is provided with a forward spar 45 extending substantially coaxially with the spar 31 of the wing 30. The outer wing 18 is provided with a cross rib 46, wing covering 47, and an end cover plate 48 similar to the construction of the wing 30. Rigidly secured to the inner end of the spar 45 is a bracket 50 which is provided with an upper outwardly extending projection 51 and a pair of lower outwardly extending superimposed projections 52 and 53 adapted for tongue and groove connection with the lock member 37 of the wing 30 and which I will hereinafter call a mortise-like locking member which constitutes the primary lock member 54. The projection 51 is provided with a threaded opening 55, and the projections 52 and 53 are provided with openings 56 and 57 which are coaxially aligned. The axes of these openings, as well as the opening 40 in the lock member 37, are inclined forwardly from the perpendicular with respect to the longitudinal axes of the spars 30 and 45, and cooperate to form a continuous bore substantially as shown in Fig. 7.

Figure 8:
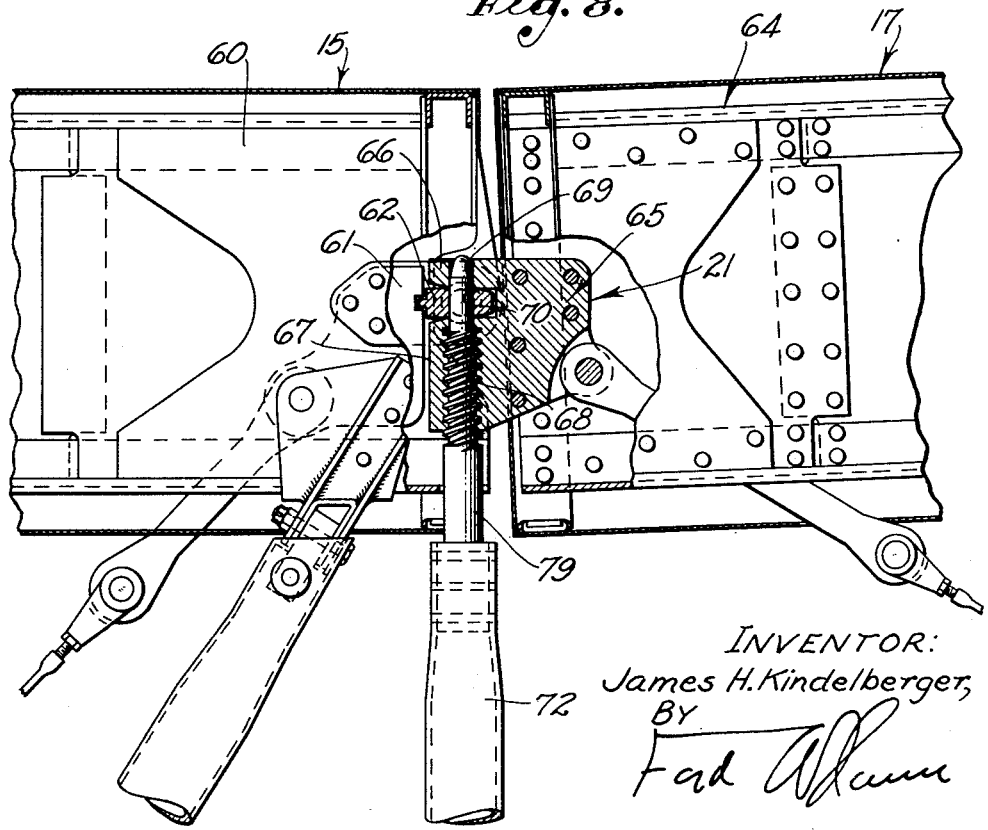
Fig. 8 is a vertical sectional view comparable to Fig. 6 but showing the locking member adapted for use on the upper wings of my invention.
Figure 15:
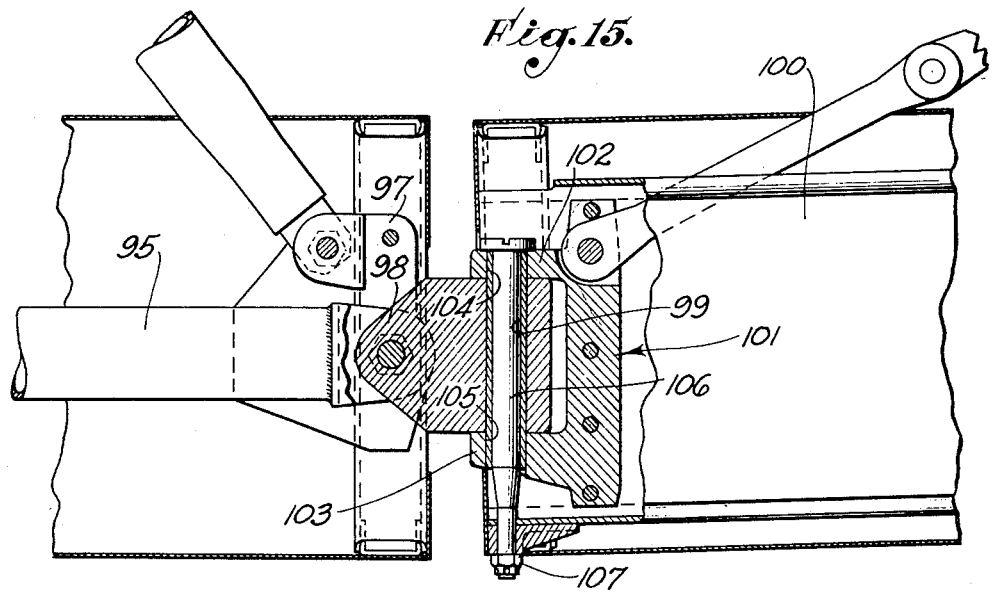
Fig. 15 is a vertical sectional view through the pivot of the lower wing, this view being taken as indicated by the line 15—15 of Fig. 14.

Coming now to a description of the lock members 21 of the upper wing structure with reference to Figs. 8, 9, and 10, I show one of the lock members 21 such as the member associated with the right-hand outer wing 17, the member 21 associated with the left-hand upper wing being identical in construction and therefore not being separately shown and described. The upper inner wing 15 is provided with a forward spar 60 which may be substantially identical with the spar 31 of the lower inner wing 30. Pivotally supported by a bracket 61 secured to the outer end of the spar 60 is an upper secondary lock member 62 which may be similar in construction and in operation to the secondary lock member 37 of the lower inner wing 30.

The upper outer wing 17 is provided with a spar 64 to the end of which is secured a bracket 65 which provides upper and lower outwardly extending projections 66 and 67 respectively adapted for tongue and groove engagement with the secondary lock member 62 as shown best in Fig. 8, and which I will hereinafter call the upper primary lock member. The lower projection is provided with a threaded opening 68 and the upper projection 66 and the secondary lock member 62 are provided with openings 69 and 70 respectively, all of these openings being coaxially aligned, the axes thereof being inclined rearwardly from the perpendicular with respect to the longitudinal axes of the spars 60 and 64, as best shown in Fig. 9.

Referring to Figs. 9 to 13 inclusive, I show a lock operating strut generally designated by the numeral 72, which comprises a tubular section 73 to the lower end of which is secured in the manner shown a threaded lock pin 74 adapted for threaded engagement with the threaded opening 55 of the primary lock member 54. The lock pin 74 is provided with a lower reduced diameter portion 75 adapted for slidable engagement with the aligned openings 56 and 57 of the primary lock member 54 and the opening 40 of the secondary lock member 37 in the manner shown in Figs. 5, 6, 7, 9, and 10, for the purpose of locking the lower primary and secondary lock members together. Suitably secured in the upper end of the tubular section 73 is an elongated bearing block 77 having a square central opening 78 which is coaxially aligned with the longitudinal axis of the lower lock pin 74. Slidably, but non-rotatably, positioned in the square opening 78 is an upper lock pin 79, the lower portion 80 of which is square in cross-section and conforms to the cross-sectional configuration of the opening 78 and the upper portion of which is provided with threads 81 adapted for engagement with the threaded opening 68 of the upper primary lock member 65 and which are pitched oppositely to the threads on the lower lock pin 74; for instance, the threads of the lower pin 74 may be left-hand threads, while the threads 81 of the pin 79 may be right-hand. The upper lock pin 79 is provided with an upper reduced diameter portion 82 adapted for slidable engagement with the aligned opening 69 of the primary member 65 and the opening 70 of the secondary lock member 62 for the purpose of locking the upper primary and secondary lock members together. The squared portion of the lock member 79 is provided with a suitable pin and slot connection with the bearing block 77, as indicated at 85, this pin and slot connection being adapted to limit the longitudinal movement of the lock pin 79 relative to the bearing block 77.

Secured to the lower portion of the tubular section 73 is a hinged handle 86 adapted to be swung from the position in which it is shown in dotted lines in Fig. 11 to the position in which it is shown in solid lines in that figure, and by which the lock operating strut 72 may be manually rotated.

The relationship between the lock operating strut 72 and the upper and lower lock pins 79 and 74 is such that when the strut 72 is rotated in a right-hand direction, the left-hand threads of the lock pin 74 will unthread relative to the threaded opening 55 of the lower primary lock member 54, thus moving the strut 72 upwardly and withdrawing the lower portion 75 of the pin 74 from the opening 40 of the secondary lock member 37 as indicated by the dotted lines 90 of Fig. 10. As this described rotation and upward movement of the strut 72 occurs, the upper lock pin 79 is likewise rotated, causing the threads 81 to unthread relative to the threaded opening 68, thus forcing the upper lock pin 79 to move downward in a sliding action relative to the upward movement of the strut 72 until the upper portion 82 of the pin 79 is likewise disengaged from the opening 70 of the upper secondary lock member 62. It will be seen that the inner and outer wings of the upper and lower wing sections are at this time free to separate.

I will now describe the details of construction of the wing pivots 19 and 20 and the collapsible wing sections 25, 26, 27, and 28 with reference to Figs. 4, 9, 14, 15, and 16.

Since the upper wing pivots 19 are substantially identical with the lower wing pivots 20, and since the collapsible wing sections 25 and 26 are substantially identical with the wing sections 27 and 28, I will describe only one of the pivots 20 such as the pivot of the lower right-hand wings 16 and 18, and its association with the adjacent collapsible wing section 27. The lower inner wing 16 is provided with a rear spar 95 which cooperates with the forward spar 31 to support the cross rib 32 in the manner shown best in Fig. 4. As will be seen in this figure, the rear spar 95 is positioned somewhat forward of the trailing edge 96 of the wing 16.

Rigidly secured to the outer end of the spar 95 is a bracket member 97 to which is suitably secured an outwardly extending projection 98 which is provided with a bore 99.

The outer wing 18 is provided with a rear spar 100 which is coaxially aligned with the spar 95 of the inner wing 16. Secured to the inner end of the spar 100 is a bracket member 101 providing upper and lower outwardly extending projections 102 and 103 which are respectively provided with axially aligned cylindrical openings 104 and 105. The projection 98 of the inner wing 16 is adapted to be received between the projections 102 and 103, and a trunnion pin 106 is provided to extend through the opening 104, the bore 99 and the opening 105, serving to pivotally connect the outer wing 18 to the inner wing 16. The trunnion 106 may be secured against removal from the openings 104 and 105 and the bore 99 by any suitable means such as is indicated at 107 in Figs. 15 and 16. The longitudinal axis of the trunnion 106 upon which the outer wing 18 is pivoted may be substantially at right angles to the longitudinal axis of the fuselage 12 and the axes of the upper pivot 19 and the lower pivot 20 are of course coaxial. The axact angle of the pivots relative to the surface of the wing, however, is not material but depends upon the slope of the longitudinal axis of the fuselage, the length of the wings, and the angle of incidence of the wings. This angle at which the pivots 19 and 20 are positioned might vary from an angle which is perpendicular to the chord of the wings to an angle which is perpendicular to the longitudinal axis of the fuselage 12, it being only necessary to place the pivots at such an angle that the outer wings will clear the ground when in folded position. In the preferred form of my invention, however, the angle of the pivots 19 and 20 is such that the outer wings 18 when in their folded position indicated in Fig. 1 lie substantially parallel to the fuselage 12.

In order to permit the outer wings to be folded rearwardly, the adjacent portions of the trailing edges of the inner and outer wings are tapered forwardly as shown at 110 and 111 respectively.

For the purpose of preventing undue contour drag when the aeroplane is in flight, the collapsible wing sections such as the section 27 are provided to fill the space between these tapered portions. This collapsible wing section comprises upper and lower thicknesses 112 and 113 formed of flexible material, such as rubberized fabric or the like, these thicknesses being respectively secured to the adjacent upper and lower edges of the tapered portions 110 and 111 by screws or other suitable means, as best shown in Fig. 14. The rearward edges of the thicknesses of flexible material are stitched together to form a closed outer end, as indicated at 114 in Fig. 14.

Figure 16:
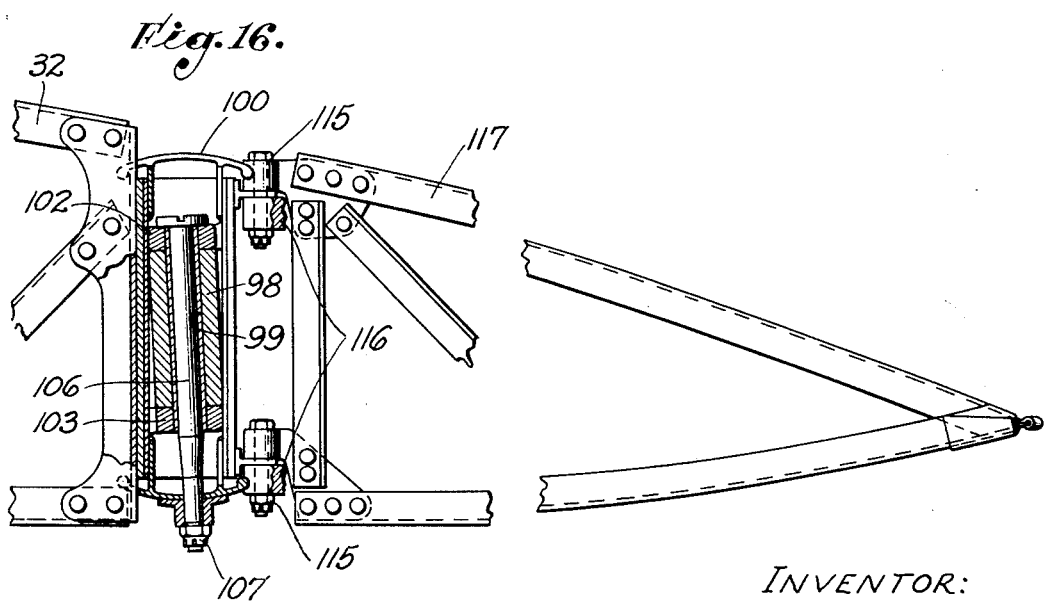
Fig. 16 is a vertical sectional view taken as indicated by the line 16—16 of Fig. 14.

Hinged to the spar 100 adjacent the wing pivot 20, as best shown at 115 in Figs. 4, 14, and 16, is a pair of web members 116 and 117. The web members 116 and 117 are adapted to extend rearwardly between the upper and lower thicknesses of material 112 and 113, the webs having a configuration adapted to shape the flexible material of the wing section 27 to form a part of the air foil contour of the wing structure 14. The outer ends of the web members 116 and 117 are provided with eyelets 118 through which a cable 119 extends. The cable 119 is secured at one end 120 to the outer wing 18 and the other end after passing through an eyelet 121 provided in the trailing edge 96 of the wing 16 is connected to a tension spring 122 which in turn is connected in the manner shown to the spar 95, this spring serving to keep the cable 119 taut and the collapsible wing section 27 stretched tightly over the webs 116 and 117 when the outer wing 18 is in its extended flying position. The cable 19 and the tension spring 22 constitute a tensioning means of my invention and will be broadly referred to by that denomination.

As best shown in Figs. 1, 4, and 9, the upper outer wings 17 and the lower outer wings 18 are provided with ailerons 125, the ailerons of the lower wings being operated direct from suitable controls in the fuselage 12 by cables 126, and the upper ailerons being operated by connecting struts 127 extending between pivotal connections on the adjacent upper and lower ailerons in a manner well known to the art.

In the preferred form of my invention the cables 126 are extended longitudinally through the lower wings at a point adjacent and rearwardly of the pivots 20. In order to prevent kinking and tangling of the cables 126 due to slack therein when the outer wings 18 are in their folded positions I provide a cable guide 130 in each of the lower wing structures. One of these guides, such as the guide associated with the lower right-hand wing, is shown in Figs. 4 and 14 and comprises a flexible tubular member 131 surrounding the cables 126 and which is connected at one end to the inner wing 16 in any suitable manner such as by a bracket 132 fixed to the spar 95. The outer end of the flexible tube is slidably received in a tube 133 which is secured to the spar 100 of the outer wing and which extends longitudinally of the wing 18 to a point adjacent the center of the aileron 125 as shown in Fig. 4.

It will be understood that when the outer wings 17 and 18 are pivoted into their respective folded positions, the flexible material comprising the wing sections 25, 26, 27, and 28 will fold to allow the beveled edges of the outer wings to swing toward the beveled edges of the inner wings, substantially as indicated by the arrow 140 of Fig. 14 until the outer wing is in the position indicated by the dotted lines 141 of this figure. The hinge 115 of the webs 116 and 117 will swing in an arc about the wing pivots substantially as indicated by the arrow 142, and the webs 116 and 117 will eventually assume approximately the positions in which they are indicated in dotted lines 143 of Fig. 14. The exact manner in which the collapsible wing sections fold is immaterial but I have found that in the preferred form of my invention the upper thickness of flexible material 112 will fold or bulge upwardly and the lower thickness 113 will fold downwardly, substantially in the manner indicated in Figs. 1 and 2.

As the outer wings are pivoted into their folded positions, as above described, the flexible tube 131 will slide inwardly in the tube 133 in a telescoping action while at the same time bending sufficiently to compensate for the change in the angle between the longitudinal axes of the spars 95 and 100, this flexible tube eventually assuming the position and shape indicated in dotted lines 145 of Fig. 14, thus obviating the possibility of the cables 126 drooping downwardly and becoming tangled or kinked. As pointed out in the statement of invention, this portion of my invention for enclosing the aileron cables is not limited to such a construction solely for use in conjunction with the aileron operating means but has a broader application; and the invention may be used for protecting any steel cables, electrical cables, or other control means which extend from operated devices in the wing to an operating means in the fuselage or elsewhere on the aeroplane.

Referring to Figs. 3, 17, and 18, I show the aeroplane which embodies the preferred form of my invention provided with locking elements generally designated by the numerals 150 and 151 adapted to lock the outer wings in folded position. The locking elements 150 and 151 comprise links 151' which are respectively connected at one end to diagonal tail struts 152 of the aeroplane by suitable universal connections 153. The other ends of the links 151' are provided with suitable manually operable latches 154 adapted for connection with I-bolts 155 secured to the outer ends of the outer wings 18 in the manner shown in Fig. 3 and in dotted lines in Fig. 17. As shown in Figs. 17 and 18, the links 151 are shaped in cross-section to conform to the configuration of the tail struts 152 so that these links may be positioned in the manner indicated in solid lines in Fig. 17 when not in use. I-brackets 156 may be provided as shown on the struts 152 to engage the latches 154 and securely retain the links in this non-operative position.

Although I have herein disclosed only one complete embodiment of my invention, it should be understod that the scope thereof is not to be limited to the construction disclosed herein, but may comprise various embodiments which do not use all of the details of construction or features of my invention. It is my intention in this application to cover not only the invention in its entirety, but to cover all of those elements which are susceptible of independent use. It is likewise my intention to cover the various features of my invention both collectively and separately in such a manner that their use on different types of aeroplanes will be covered by the claims. It will be quite obvious to anyone skilled in the art that the various features of my invention may be used on various types of planes. For example, the features may be used on land planes, sea planes, amphibians, and may be used with equal facility on monoplanes, biplanes, triplanes, etc. The various terms utilized in the claims should be given a broad interpretation. It is also my intention to cover all equivalents of my invention by the breadth of the appended claims.

I claim as my invention:

1. In an aeroplane, the combination of: a fuselage; a wing structure including an inner wing connected to said fuselage, to each end of which inner wing an outer wing is pivoted at a point forward of the trailing edges of said wings and in a plane substantially at right angles to the longitudinal axis of said fuselage, said inner wing and said outer wings having adjacent portions of their trailing edges tapered forwardly to allow said outer wings to pivot from an extended flying position into a folded position; and collapsible wing sections formed of a flexible material secured to the adjacent edges of the tapered portions of said inner wing and said outer wings and forming a part of the air foil contour of said wing structure when said outer wings are in said extended flying position, and being operable to collapse when said outer wings are pivoted into said folded position.

2. In an aeroplane, the combination of: a fuselage; a wing structure including an inner wing connected to said fuselage, to each end of which inner wing an outer wing is pivoted at a point forward of the trailing edges of said wings and in a plane substantially at right angles to the longitudinal axis of said fuselage, said inner wing and said outer wings having adjacent portions of their trailing edges tapered forwardly to allow said outer wings to pivot from an extended flying position into a folded position; double walled collapsible wing sections formed of a flexible material secured to and extending between the adjacent edges of said tapered portions of said inner wing and said outer wings; and a plurality of web members hinged to said wing structure adjacent each of said wing pivots and extending between said double walls of each of said collapsible wing sections, said webs having a configuration adapted to shape said wing sections to form parts of the air foil contour of said wing structure when said outer wings are in said extended flying position, and said webs being operable to swing on said hinges to allow said wing sections to collapse when said outer wings are pivoted into said folded position.

3. In an aeroplane, the combination of: a fuselage; a wing structure including an inner wing connected to said fuselage, to each end of which inner wing an outer wing is pivoted at a point forward of the trailing edges of said wings and in a plane substantially at right angles to the longitudinal axis of said fuselage, said inner wing and said outer wings having adjacent portions of their trailing edges tapered forwardly to allow said outer wings to pivot from an extended flying position into a folded position; collapsible wing sections formed of a flexible material secured to the adjacent edges of the tapered portions of said inner wing and said outer wings and forming a part of the air foil contour of said wing structure when said outer wings are in said extended flying position, and being operable to collapse when said outer wings are pivoted into said folded position; means for releasably locking said outer wings in said flying position; and means for releasably locking said outer wings in said folded position.

4. In an aeroplane, the combination of: a fuselage; a wing structure including an inner wing connected to said fuselage, to each end of which inner wing an outer wing is pivoted at a point forward of the trailing edges of said wings and in a plane substantially at right angles to the longitudinal axis of said fuselage, said inner wing and said outer wings having adjacent portions of their trailing edges tapered forwardly to allow said outer wings to pivot from an extended flying position into a folded position; double walled collapsible wing sections formed of a flexible material secured to and extending between the adjacent edges of said tapered portions of said inner wing and said outer wings; a plurality of web members hinged to said wing structure adjacent each of said wing pivots and extending between said double walls of each of said collapsible wing sections, said webs having a configuration adapted to shape said wing sections to form parts of the air foil contour of said wing structure when said outer wings are in said extended flying position, and said webs being operable to swing on said hinges to allow said wing sections to collapse when said outer wings are pivoted into said folded position; means for releasably locking said outer wings in said flying position; and means for releasably locking said outer wings in said folded position.

5. In an aeroplane, the combination of: a fuselage; an upper and a lower wing structure, each structure including an inner wing secured to said fuselage and a pair of outer wings pivoted to opposite ends of said inner wings at points forward of the trailing edges of said wings and substantially at right angles to the longitudinal axis of said fuselage, said inner wings and said outer wings having adjacent portions of their trailing edges tapered forwardly to allow said outer wings to pivot from an extended flying position into a folded position; and collapsible wing sections in each of said wing structures, said sections being formed of a flexible material secured to the adjacent edges of the tapered portions of said inner wings and said outer wings, and forming parts of the air foil contour of said wing structures when said outer wings are in said extended flying position and being operable to collapse when said outer wings are pivoted to said folded position.

6. In an aeroplane, the combination of: a fuselage; an upper and a lower wing structure, each structure including an inner wing secured to said fuselage and a pair of outer wings pivoted to opposite ends of said inner wings at points forward of the trailing edges of said wings and substantially at right angles to the longitudinal axis of said fuselage, said inner wings and said outer wings having adjacent portions of their trailing edges tapered forwardly to allow said outer wings to pivot from an extended flying position into a folded position; double walled collapsible wing sections in each of said wing structures, said sections being formed of a flexible material secured to and extending between the adjacent edges of said tapered portions of said inner wings and said outer wings; and a plurality of web members hinged to said wing structures adjacent each of said wing pivots and extending between said double walls of each of said collapsible wing sections, said webs having a configuration adapted to shape said wing sections to form parts of the air foil contour of said wing structures when said outer wings are in said extended flying position, and said webs being operable to swing on said hinges to allow said wing sections to collapse when said outer wings are pivoted into said folded position.

7. In an aeroplane, the combination of: a fuselage; an upper and a lower wing structure, each structure including an inner wing secured to said fuselage and a pair of outer wings pivoted to opposite ends of said inner wings at points forward of the trailing edges of said wings and substantially at right angles to the longitudinal axis of said fuselage, said inner wings and said outer wings having adjacent portions of their trailing edges tapered forwardly to allow said outer wings to pivot from an extended flying position into a folded position; collapsible wing sections in each of said wing structures, said sections being formed of a flexible material secured to the adjacent edges of the tapered portions of said inner wings and said outer wings, and forming parts of the air foil contour of said wing structures when said outer wings are in said extended flying position and being operable to collapse when said outer wings are pivoted to said folded position; locking means associated with the adjacent outer wings of said upper and lower wing structures for locking said outer wings in said extended flying position, said means being operable to simultaneously release said adjacent upper and lower outer wings; and means for releasably locking said outer wings in said folded position.

8. In an aeroplane, the combination of: a fuselage; an upper and a lower wing structure, each structure including an inner wing secured to said fuselage and a pair of outer wings pivoted to opposite ends of said inner wings at points forward of the trailing edges of said wings and substantially at right angles to the longitudinal axis of said fuselage, said inner wings and said outer wings having adjacent portions of their trailing edges tapered forwardly to allow said outer wings to pivot from an extended flying position into a folded position; double walled collapsible wing sections in each of said wing structures, said sections being formed of a flexible material secured to and extending between the adjacent edges of said tapered portions of said inner wings and said outer wings; a plurality of web members hinged to said wing structures adjacent each of said wing pivots and extending between said double walls of each of said collapsible wing sections, said webs having a configuration adapted to shape said wing sections to form parts of the air foil contour of said wing structures when said outer wings are in said extended flying position, and said webs being operable to swing on said hinges to allow said wing sections to collapse when said outer wings are pivoted into said folded position; locking means associated with the adjacent outer wings of said upper and lower wing structures for locking said outer wings in said extended flying position, said means being operable to simultaneously release said adjacent upper and lower outer wings; and means for releasably locking said outer wings in said folded position.

9. In an aeroplane, the combination of: a fuselage; an upper and a lower wing structure, each including an inner wing rigidly secured to said fuselage and a pair of outer wings pivoted to opposite ends of said inner wing at points adjacent the trailing edges thereof and substantially at right angles to the longitudinal axis of said fuselage, the adjacent upper and lower outer wings being rigidly connected together by suitable struts and being operable to pivot relative to said inner wings from an extended flying position into a folded position; locking means associated with said upper and lower wing structures, said means including a primary lock member projecting outwardly from the inner end of each of said outer wings at points adjacent the leading edges thereof and in a plane substantially parallel to the longitudinal axis of said wing structures; a pair of outwardly extending projections on each of said primary lock members, said projections forming a recess; walls forming coaxial openings in each of said projections, said openings communicating with said recess; secondary lock members secured to the outer ends of said inner wings adjacent each of said primary lock members, each of said secondary lock members having an outwardly extending lug adapted for tongue and groove connection with said recesses; walls forming an opening through each of said lugs adapted to cooperate with said openings in said primary lock members to form a continuous bore when said outer wings are in said extended flying position; a locking pin threadedly engaging each of said primary lock members and adapted for extension into said bores; a lock operating strut rigidly secured at the lower end thereof to each of said locking pins associated with said lower wing structure, said strut members having a longitudinally slidable, but non-rotatable, connection with said adjacent locking pins associated with said upper wing structure; and means for manually rotating said struts whereby said threaded pins are simultaneously retracted from said bores to permit said tongue and groove connections of said primary and said secondary lock members to be separated.

10. In an aeroplane, the combination of: a fuselage; an upper and a lower wing structure, each structure including an inner wing secured to said fuselage and a pair of outer wings pivoted to opposite ends of said inner wings at points forward of the trailing edges of said wings and substantially at right angles to the longitudinal axis of said fuselage; collapsible sections in each of said wing structures lying between adjacent portions of the trailing edges of said inner wing and said outer wings, said sections forming parts of the air foil contour of said wing structures when said outer wings are in an extended flying position and being operable to collapse when said outer wings are pivoted to a folded position; locking means associated with said upper and lower wing structures, said means including a primary lock member projecting outwardly from the inner end of each of said outer wings at points adjacent the leading edges thereof and in a plane substantially parallel to the longitudinal axis of said wing structures; a pair of outwardly extending projections on each of said primary lock members, said projections forming a recess; walls forming coaxial openings in each of said projections, said openings communicating with said recess; secondary lock members secured to the outer ends of said inner wings adjacent each of said primary lock members, each of said secondary lock members having an outwardly extending lug adapted for tongue and groove connection with said recesses; walls forming an opening through each of said lugs adapted to cooperate with said openings in said primary lock members to form a continuous bore when said outer wings are in said extended flying position; a locking pin threadedly engaging each of said primary lock members and adapted for extension into said bores; a lock operating strut rigidly secured at the lower end thereof to each of said locking pins associated with said lower wing structure, said strut members having a longitudinally slidable, but non-rotatable, connection with said adjacent locking pins associated with said upper wing structure; and means for manually rotating said struts whereby said threaded pins are simultaneously retracted from said bores to permit said tongue and groove connections of said primary and said secondary lock members to be separated.

11. In an aeroplane, the combination of: a fuselage having an aileron control therein; an upper and a lower wing structure, each structure including an inner wing secured to said fuselage and a pair of outer wings having ailerons thereon, said outer wings being pivoted to opposite ends of said inner wings at points forward of the trailing edges of said wings and substantially at right angles to the longitudinal axis of said fuselage; collapsible sections in each of said wing structures lying between adjacent portions of the trailing edges of said inner wing and said outer wings, said sections forming parts of the air foil contour of said wing structures when said outer wings are in an extended flying position, and being operable to collapse when said outer wings are pivoted to a folded position; control cables operably connected between said aileron control and said ailerons within said lower wing structure; and control cable guide members within said lower wing structure adjacent said collapsible sections, said guides being operable to support and prevent the kinking of said cables when said outer wings are pivoted to said folded position.

12. In an aeroplane, the combination of: a fuselage having an aileron control therein; an upper and a lower wing structure, each structure including an inner wing secured to said fuselage and a pair of outer wings having ailerons thereon, said outer wings being pivoted to opposite ends of said inner wings at points forward of the trailing edges of said wings and substantially at right angles to the longitudinal axis of said fuselage; collapsible sections in each of said wing structures lying between adjacent portions of the trailing edges of said inner wing and said outer wings, said sections forming parts of the air foil contour of said wing structures when said outer wings are in an extended flying position, and being operable to collapse when said outer wings are pivoted to a folded position; control cables operably connected between said aileron control and said ailerons within said lower wing structure; control cable guide members within said lower wing structure adjacent said collapsible sections, said guides comprising flexible tubular member surrounding and supporting said cables, said members being secured at the inner ends thereof to said inner wings, and having the other ends thereof slidably supported in tubes secured to said outer wings, said flexible tubular members being operable to support said cables and to prevent the kinking thereof when said outer wings are pivoted into said folded position; means for locking said outer wings in said extended flying position; and means for locking said outer wings in said folded position.

13. In an aeroplane having a folding wing construction, the combination of: a fuselage; an inner wing structure secured to said fuselage; an outer wing structure; a pivot located at a point forward of the trailing edges of said inner and outer wing structures for pivoting said wing structures together, there being a space provided between said pivot and the trailing edges of said wing structures; and a collapsible section in said space forming a part of the air foil contour of said wing structures, said collapsible section including a web member pivoted to one of said wing structures near said pivot, a collapsible covering partly supported by said web member, and tensioning means associated with said wing structures and said web member, said tensioning means including a cable extending across the rearward boundary of said space, and spring means for exerting a pull on said cable.

14. In an aeroplane having a folding wing construction, the combination of: a fuselage; an inner wing structure secured to said fuselage; an outer wing structure; a pivot located at a point forward of the trailing edges of said inner and outer wing structures for pivoting said wing structures together, there being a space provided between said pivot and the trailing edges of said wing structures; and a collapsible section in said space forming a part of the air foil contour of said wing structures, said collapsible section including a web member pivoted to one of said wing structures near said pivot, and a collapsible covering partly supported by said web member, the trailing edge of said inner wing structure being offset forwardly of said outer wing structure and the trailing edge of said collapsible section connecting together the trailing edges of said inner and outer wing structures.

15. In an aeroplane having a folding wing construction, the combination of: a fuselage construction; a wing construction; pivot means for pivoting said wing construction to said fuselage construction, said wing construction being capable of swinging from extended to folded position; a locking lug pivoted to one of said constructions in a plane substantially parallel to the plane of swinging of said wing construction; and a mortise-like locking member secured to the other of said constructions, having a space for receiving said locking lug when said wing construction is in extended position.

16. In an aeroplane having a folding wing construction, the combination of: a fuselage construction; a wing construction; pivot means for pivoting said wing construction to said fuselage construction, said wing construction being capable of swinging from extended to folded position; a locking lug pivoted to one of said constructions in a plane substantially parallel to the plane of swinging of said wing construction; a mortise-like locking member secured to the other of said constructions, having a space for receiving said locking lug when said wing construction is in extended position; and means adapted to engage said locking lug and said mortise-like locking member for locking them together.

17. In an aeroplane having a folding wing construction, the combination of: a fuselage construction; a wing construction; pivot means for pivoting said wing construction to said fuselage construction, said wing construction being capable of swinging from extended to folded position; a locking lug pivoted to one of said constructions in a plane substantially parallel to the plane of swinging of said wing construction; a mortise-like locking member secured to the other of said constructions, having a space for receiving said locking lug when said wing construction is in extended position, said locking lug and said mortise-like locking member having openings therein which are aligned when said wing construction is in extended position; and means adapted to extend through said openings of said locking lug and said mortise-like locking member for locking them together.

18. In an aeroplane having a folding wing construction, the combination of: a fuselage construction; a wing construction; pivot means for pivoting said wing construction to said fuselage construction, said wing construction being capable of swinging from extended to folded position; a locking lug pivoted to one of said constructions in a plane substantially parallel to the plane of swinging of said wing construction; a mortise-like locking member secured to the other of said constructions, having a space for receiving said locking lug when said wing construction is in extended position, said locking lug and said mortise-like locking member having openings therein which are aligned when said wing construction is in extended position; and a threaded member supported by one of said constructions having an engaging portion which, upon rotation of said threaded member, may be advanced to extend through said openings of said locking lug and said mortise-like locking member for locking them together.

19. In an aeroplane having a folding wing construction, the combination of: a fuselage construction; a wing construction having upper and lower wings and interbracing therefor; pivot means on each of said wings for pivoting said wing construction to said fuselage construction so that said wing construction is swingable between extended and folded position; lock means for locking each of said upper and lower wings to said fuselage construction; a lock pin adapted to engage each of said lock means whereby said wing construction may be locked in extended position; and unitary means for simultaneously operating said lock pins.

20. In an aeroplane having a folding wing construction, the combination of: a fuselage construction; a wing construction having upper and lower wings and interbracing therefor; pivot means on each of said wings for pivoting said wing construction to said fuselage construction so that said wing construction is swingable between extended and folded position; lock means for locking each of said upper and lower wings to said fuselage construction; a lock pin adapted to engage each of said lock means whereby said wing construction may be locked in extended position; and a strut extending between said upper and lower wings and being rotatable to operate said lock pins.

21. In an aeroplane having a folding wing construction, the combination of: a fuselage construction; a wing construction having upper and lower wings and interbracing therefor; pivot means on each of said wings for pivoting said wing construction to said fuselage construction so that said wing construction is swingable between extended and folded position; lock means for locking each of said upper and lower wings to said fuselage construction; a rotatable member extending between said upper and lower wings; and upper and lower lock pins operable upon rotation to engage said lock means, said lock pins being operatively connected to said rotatable member so as to be rotated thereby.

22. In an aeroplane having a folding wing construction, the combination of: a fuselage construction; a wing construction having upper and lower wings and interbracing therefor; pivot means on each of said wings for pivoting said wing construction to said fuselage construction so that said wing construction is swingable between extended and folded position; lock means for locking each of said upper and lower wings to said fuselage construction; a rotatable member extending between said upper and lower wings; and upper and lower lock pins operable upon rotation to engage said lock means, said lock pins being operatively connected to said rotatable member so as to be rotated thereby, one of said lock pins being rigidly secured to said rotatable member and the other of said lock pins being slidably secured thereto.

23. In an aeroplane having a folding wing construction, the combination of: a fuselage construction; a wing construction having upper and lower wings and interbracing therefor; pivot means on each of said wings for pivoting said wing construction to said fuselage construction so that said wing construction is swingable between extended and folded position; lock means for locking each of said upper and lower wings to said fuselage construction; a nut secured to one of said constructions adjacent each of said lock means; a lock pin carried by each of said nuts and upon rotation being advanceable to lock said lock means; and a rotatable strut extending between said upper and lower wings and being operatively connected to each of said lock pins for operating them.

24. In an aeroplane having a folding wing construction, the combination of: a fuselage construction; a wing construction having upper and lower wings and interbracing therefor; pivot means on each of said wings for pivoting said wing construction to said fuselage construction so that said wing construction is swingable between extended and folded position; lock means for locking each of said upper and lower wings to said fuselage construction; a nut secured to each of said upper and lower wings of said wing construction adjacent each of said lock means; a lock pin carried by each of said nuts and upon rotation being advanceable to lock said lock means; and a rotatable strut extending between said upper and lower wings and being operatively connected to each of said lock pins for operating them.

25. In an aeroplane having a folding wing construction, the combination of: a fuselage construction; a wing construction having upper and lower wings and interbracing therefor; pivot means on each of said wings for pivoting said wing construction to said fuselage construction so that said wing construction is swingable between extended and folded position; lock means for locking each of said upper and lower wings to said fuselage construction; a nut secured to each of said upper and lower wings of said wing construction adjacent each of said lock means; a lock pin carried by each of said nuts and upon rotation being advanceable to lock said lock means; and a rotatable strut extending between said upper and lower wings and being operatively connected to each of said lock pins for operating them, said strut being placed under compression when said lock pins are in non-locking position.

26. As a new article of manufacture, a strut construction having: a strut; and a lock pin secured to each end thereof, one of said lock pins being slidably secured to said strut and the other of said lock pins being rigidly secured to said strut.

27. In an aeroplane having a folding wing construction, the combination of: a fuselage construction; a wing construction; a pivot located forward of the trailing edge of said wing construction for pivoting said wing construction to said fuselage construction; an operable device in said wing construction; operating means in said fuselage construction; a control member extending from said operating means through said wing construction to said operable device; and a conduit for said control member including a primary conduit member connected to said fuselage construction, a secondary conduit member connected to said wing construction, and a flexible conduit member connecting said primary and secondary conduit members together and being slidable with respect to one of said primary or secondary conduit members, said flexible conduit being situated at the junction of said fuselage construction and said wing construction.

28. In an aeroplane having a folding wing construction, the combination of: a fuselage construction; a wing construction; a pivot located forward of the trailing edge of said wing construction for pivoting said wing construction to said fuselage construction; a collapsible section situated between said pivot and the trailing edge of said wing construction; an operable device in said wing construction; operating means in said fuselage construction; a control member extending from said operating means through said wing construction to said operable device; and a conduit for said control member, said conduit having a flexible section at the junction of said fuselage construction and said wing construction and being situated in said collapsible section.

29. In an aeroplane having a folding wing construction, the combination of: a fuselage construction; a wing construction; a pivot located forward of the trailing edge of said wing construction for pivoting said wing construction to said fuselage construction; a collapsible section situated between said pivot and the trailing edge of said wing construction; an operable device in said wing construction; operating means in said fuselage construction; a control member extending from said operating means through said wing construction to said operable device; and a conduit for said control member including a primary conduit member connected to said fuselage construction, a secondary conduit member connected to said wing construction, and a flexible conduit member connecting said primary and secondary conduit members together and being slidable with respect to one of said primary or secondary conduit members, said flexible conduit being situated at the juncture of said fuselage construction and said wing construction and being situated in said collapsible section.

30. In combination in an aeroplane construction: a brace member having a rounded external surface; an arm consisting of a wall shaped to adhere closely to said brace member when laid therealong; a universal joint connecting one end of said arm to said brace member; and means for releasably connecting the other end of said arm to said brace member.

31. In an aeroplane having a folding wing construction, the combination of: a fuselage construction; a wing construction; pivot means for pivoting said wing construction to said fuselage construction, said wing construction being capable of swinging from extended to folded position; a locking lug pivoted in a permanent manner to one of said constructions in a plane substantially parallel to the plane of swinging of said wing construction; and a mortise-like locking member secured in a permanent manner to the other of said constructions, having a space for receiving said locking lug when said wing construction is in extended position.

JAMES H. KINDELBERGER.